United States Patent [19]

Maeba et al.

[11] Patent Number: 4,747,012
[45] Date of Patent: May 24, 1988

[54] APPARATUS FOR SUPPLYING HIGH AND MEDIUM OUTPUT VOLTAGES WITH A SINGLE TRANSFORMER, HAVING SWITCHABLY VARIABLE FEEDBACK MEANS FOR CONTROLLING THE INPUT CURRENT TO THE TRANSFORMER

[75] Inventors: Yukio Maeba; Kiyoteru Igashira, both of Nagaokakyo, Japan

[73] Assignee: Murata Manufacturing Co., Ltd., Japan

[21] Appl. No.: 1,515

[22] Filed: Jan. 7, 1987

[30] Foreign Application Priority Data

Jan. 10, 1986 [JP] Japan .................... 61-2297[U]
Jan. 10, 1986 [JP] Japan .................... 61-2298[U]

[51] Int. Cl.⁴ .................... H01T 23/00; H02M 3/335
[52] U.S. Cl. .................... 361/235; 307/35; 355/3 CH; 363/21
[58] Field of Search .................... 363/21; 361/235; 355/3 CH, 14 CH; 323/281; 307/33, 35

[56] References Cited

U.S. PATENT DOCUMENTS 4,672,516 6/1987 Ney et al. .................... 363/21

FOREIGN PATENT DOCUMENTS 4815 1/1981 Japan .................... 323/281
85110 5/1982 Japan .................... 323/281
141727 9/1982 Japan .................... 363/21

Primary Examiner—William H. Beha, Jr.
Attorney, Agent, or Firm—Ostrolenk, Faber, Gerb & Soffen

[57] ABSTRACT

A high-voltage power supply apparatus comprises a transformer, and an input winding is turned on and off repeatedly by a switching element, and thereby an alternating current (AC) is generated in the input winding. By varying a turned-on state or a turned-off state of the switching element, a voltage outputted from an output winding of the transformer is regulated. An output voltage of a dividing circuit which is constituted with two series resistors and divides an output voltage is compared with a reference voltage by a comparator, and a control signal in accordance with an output of the comparator is given to the switching element. A switching circuit is connected to one of the resistors of the voltage dividing circuit in parallel. When a switching circuit is turned on, the output voltage of the voltage dividing circuit becomes relatively small and a voltage of the AC generated in the input winding becomes high, and therefore a voltage of a magnitude required for both the high voltage circuit and the medium voltage circuit is obtained from the output winding. When the switching circuit is turned off, the voltage of the AC becomes low, and therefore a voltage required only for the medium voltage circuit is obtained from the output winding.

6 Claims, 2 Drawing Sheets

APPARATUS FOR SUPPLYING HIGH AND MEDIUM OUTPUT VOLTAGES WITH A SINGLE TRANSFORMER, HAVING SWITCHABLY VARIABLE FEEDBACK MEANS FOR CONTROLLING THE INPUT CURRENT TO THE TRANSFORMER

BACKGROUND OF THE INVENTION

1. Field of the Invention

The present invention relates to a high-voltage power supply apparatus. More specifically, the present invention relates to a high-voltage power supply apparatus which controls supply voltages to two circuits respectively requiring voltages of different magnitudes which are both connected to an output winding of a single transformer.

2. Description of the Prior Art

Conventionally, equipment requiring a relatively high voltage and another voltage which is higher (hereinafter referred to as "medium voltage" and "high voltage"), for example, an electrostatic copier, electrostatic printer, electrostatic facsimile or the like is provided with two individual transformers dedicated to the medium voltage and the high voltage, respectively.

Such installation of the dedicated transformers in the respective circuit requiring the medium voltage (hereinafter referred to as "medium voltage circuit") and circuit requiring the high voltage (hereinafter referred to as "high voltage circuit") not only makes miniaturization of the power supply apparatus difficult but also raises the cost thereof. On the other hand, it is also possible for power to be supplied simultaneously to both the medium voltage circuit and the high voltage circuit using a common transformer. However, it is not easy to independently turn on and off the medium voltage circuit and the high voltage circuit in such a high-voltage power supply apparatus.

SUMMARY OF THE INVENTION

Therefore, the principal object of the present invention is to provide a high-voltage power supply apparatus which can supply power to the medium voltage circuit and the high voltage circuit by a common transformer, and can independently turn on and off the medium voltage circuit and the high voltage circuit.

A high-voltage power supply apparatus in accordance with the present invention comprises a transformer having an input winding and an output winding, a medium voltage circuit and a high voltage circuit which are connected between one end of the output winding and a reference potential in parallel with each other, a voltage dividing circuit which has a series connection of at least two resistors, receives a voltage correlating to an output voltage of the output winding and divides that voltage, controlling means for controlling an amount of an AC current flowing through the input winding of the transformer in accordance with an output voltage of the voltage dividing circuit, and a switching circuit which is connected in parallel with one of the resistors of the voltage dividing circuit. The magnitude of the output voltage of the voltage dividing circuit is varied by turning on or off the switching circuit, and thereby the magnitude of the output voltage from the output winding is controlled.

To be detailed, regulation of the output voltage of the output winding of the transformer is performed by controlling the amount of the AC current flowing into the input winding in accordance with the output voltage of the voltage dividing circuit by the controlling circuit.

When the switching circuit is turned on, one of the resistors constituting the voltage dividing circuit is short-circuited, and therefore the output voltage of the voltage dividing circuit becomes small. Consequently, the amount of the AC current flowing into the input winding being controlled by the controlling means becomes large, and accordingly the voltage of the output winding of the transformer becomes large, and both the medium voltage circuit and the high voltage circuit can be operated.

On the other hand, when the switching circuit is turned off, the output voltage of the voltage dividing circuit becomes large. Consequently, the amount of the AC current flowing into the input winding being controlled by the controlling means becomes small, and accordingly the voltage of the output winding of the transformer becomes small. At this time, by reducing the output voltage of the transformer lower than the operating voltage of the high voltage circuit by the controlling means, the high voltage circuit can be independently turned off.

In accordance with the present invention, power can be supplied to the medium voltage circuit and the high voltage circuit by the common transformer, and the high voltage circuit can be turned off independently during operation of the medium voltage circuit. Accordingly, the present invention can be utilized with great advantage as a power supply for equipment, for example, an electrostatic copier wherein the medium voltage circuit is operated and only the high voltage circuit is required to be turned off.

If a dedicated switching means is installed in association with the medium voltage circuit, the medium voltage circuit can also be independently turned off by the dedicated switching means.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
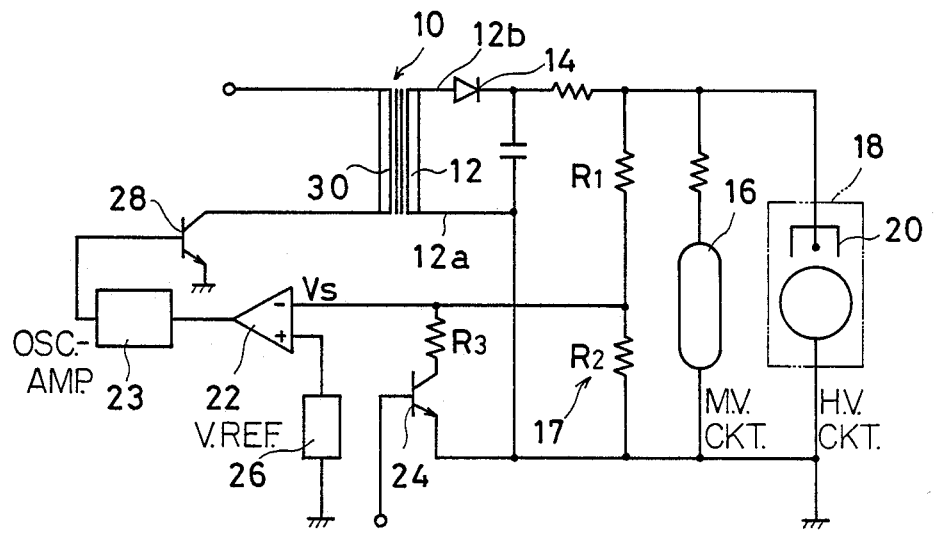
FIG. 1 is a circuit diagram showing one embodiment in accordance with the present invention.

FIG. 1 is a circuit diagram showing one embodiment in accordance with the present invention. A transformer 10 comprises an output winding 12. A low potential side 12a of the output winding 12 is grounded. Each first end of a medium voltage circuit 16 and a high voltage circuit 18 is connected to a high potential side 12b of the output winding 12 through a forward diode 14, and each of the other second ends thereof is grounded.

The medium voltage circuit 16 comprises, for example, a developing bias circuit of an electrostatic copier, and the high voltage circuit 18 comprises, for example, an equipment wherein no current flows at lower than the operating voltage thereof, for example a corona discharger 20 of the electrostatic copier.

A series connection of a resistor $R_1$ and a resistor $R_2$ constituting a voltage dividing circuit 17 is connected in parallel with the medium voltage circuit 16 and the high voltage circuit 18. A connected point of the resistors $R_1$ and $R_2$, that is, the output of the voltage dividing circuit 17 is connected to a (−) input of a voltage comparator 22. Also, a series connection of a resistor $R_3$ and a transistor 24 is connected to the resistor $R_2$ in parallel. In this embodiment, the output voltage of the transformer 10 is of positive polarity, and therefore an npn transistor is used for the transistor 24.

A reference voltage from a comparing reference voltage source 26 is given to a (+) input of the voltage comparator 22. Then, the output terminal of the voltage comparator 22 is connected to the base of an npn transistor 28 through a suitable oscillator-amplifier circuit 23. More specifically, the voltage comparator 22 outputs a voltage having a level varying in accordance with the difference between two input voltages. This output voltage of the voltage comparator 22 is given to the oscillator-amplifier circuit 23. The oscillator-amplifier circuit 23 outputs a control signal having a voltage level proportional to the level of the voltage inputted from the voltage comparator 22. The control signal is applied to the base of the transistor 28. Accordingly, the transistor 28 repeats turn-on and -off in response to the control signal. Consequently, an AC current having a magnitude in accordance with the control signal is generated in an input winding 30 of the transformer 10. Accordingly, by adequately regulating the turned-on or -off state of the transistor 28, that is, by controlling the amount of the current of the input winding 30, the magnitude of the output voltage from the output winding 12 can be regulated.

In FIG. 1 embodiment, when an AC voltage is generated in the input winding 30 by switching the transistor 28, a voltage is induced in the output winding 12, and this induced voltage is rectified by the diode 14, and appears as a voltage of positive polarity from the high voltage side 12b of the output winding 12.

When operating not only the medium voltage circuit 16 but also the high voltage circuit 18, a high-level voltage is given to the base of the transistor 24 from the controlling circuit (not illustrated). Then, the transistor 24 is turned on, and the resistor $R_3$ is connected to the resistor $R_2$ in parallel. When the resistors $R_2$ and $R_3$ are operated as a parallel circuit, the ratio of voltage dividing of the voltage dividing circuit 17 is reduced, and therefore the voltage of the connection point of the resistors $R_1$, $R_2$ and $R_3$, that is, an input voltage Vs to the voltage comparator 22, is reduced in comparison with the case when the transistor 24 is turned off according to the following equation (1).

$$Vs = V_0 \cdot Rf/(R_1 + Rf) \qquad (1)$$

where, $Rf = R_2 \cdot R_3/(R_2 + R_3)$.

This reduction in the voltage Vs increases the output of the voltage comparator 22. Accordingly, the period of the ON time of the transistor 28 becomes long, the AC voltage generated in the output winding 30 is increased, and the induced voltage of the output winding 12 is also increased. At this time, if the output voltage V is set higher than the operating voltage of the corona discharger 20 comprised in the high voltage circuit 18, both of the medium voltage circuit 16 and the high voltage circuit 18 can be operated.

On the other hand, the current flowing into the medium voltage circuit 16 does not pass through the resistors $R_1$, $R_2$ and $R_3$ and therefore even if the medium voltage circuit 16 operates, it does not affect the voltage dividing ratio.

To put the high voltage circuit 18 in the non-operating state (turn-off state), a low-level voltage is given to the base of the transistor 24 from the controlling circuit (not illustrated). Responsively, the transistor 24 is turned off. At this time, an output voltage Vs' of the voltage dividing circuit 17 is expressed by the following equation (2), becoming large in comparison with the case of the preceding equation (1).

$$Vs' = V_0' \cdot R_2/(R_1 + R_2) \qquad (2)$$

Accordingly, the output of the voltage comparator 22 becomes small, shortening the ON time of the transistor 28. Consequently, the induced voltage of the output winding 12 of the transformer 10 becomes small. At this time, by setting the output voltage Vs' lower than the discharge starting voltage of the corona discharger 20, no current flows into the high voltage circuit 18, and this high voltage circuit 18 is virtually turned off.

In addition, when the output voltage level of the voltage dividing circuit 17 is switched over, that is, when the switching element 24 constituting the switching circuit is turned on or off, the voltage from the output winding 12 of the transformer 10 is varied. For this reason, in the medium voltage circuit 16, a voltage regulator may be installed as required.

Figure 2:
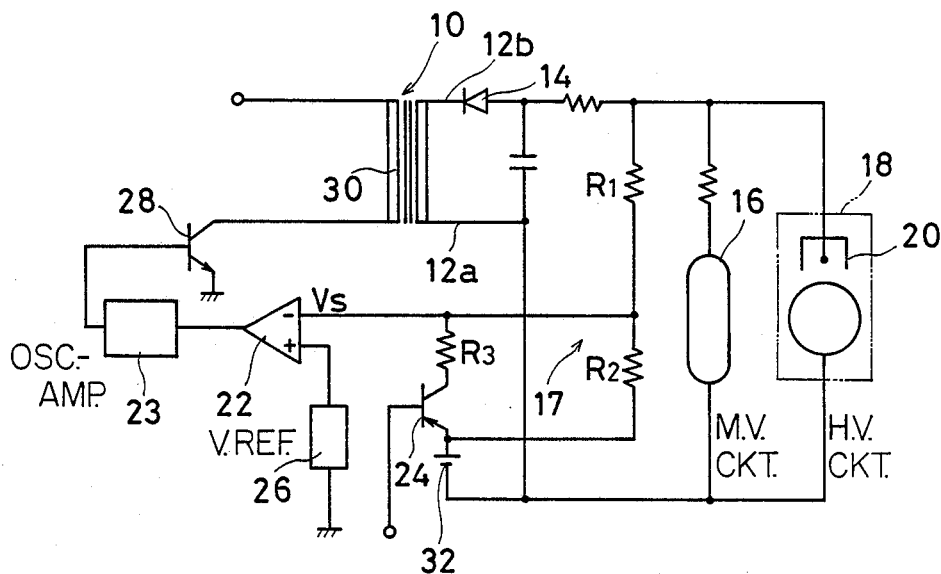
FIG. 2 is a circuit diagram showing another embodiment in accordance with the present invention.

FIG. 2 is a circuit diagram showing another embodiment in accordance with the present invention. The difference of this embodiment from the FIG. 1 embodiment is that the polarity of corona generated by the corona discharger 20, that is, the polarity of the output voltage of the output winding 12 of the transformer 10 is reverse. Consequently, the diode 14 is connected in the reverse direction in comparison with the case of FIG. 1, and a pnp transistor is used for the transistor 24. Then, a voltage Vk of a power supply 32 is applied to an emitter of the transistor 24.

In this embodiment, the input voltage Vs an Vs' to the voltage comparator 22 responding to turn-on or -off of the transistor 24 are given by the following equations (3) and (4), respectively.

$$Vs = Vk - V_0 \cdot Rf/(R_1 + Rf) \qquad (3)$$

where, $Vk > Vs$ $$Vs' = Vk - V_0 \cdot R_2/(R_1 + R_2) \qquad (4)$$

For this reason, also in this embodiment, when operating the high voltage circuit 18, a low level has only to be inputted to the base of the transistor 24 to turn it on, and to operate the medium voltage circuit 16, a high level has only to be inputted to the transistor 24.

Figure 3:
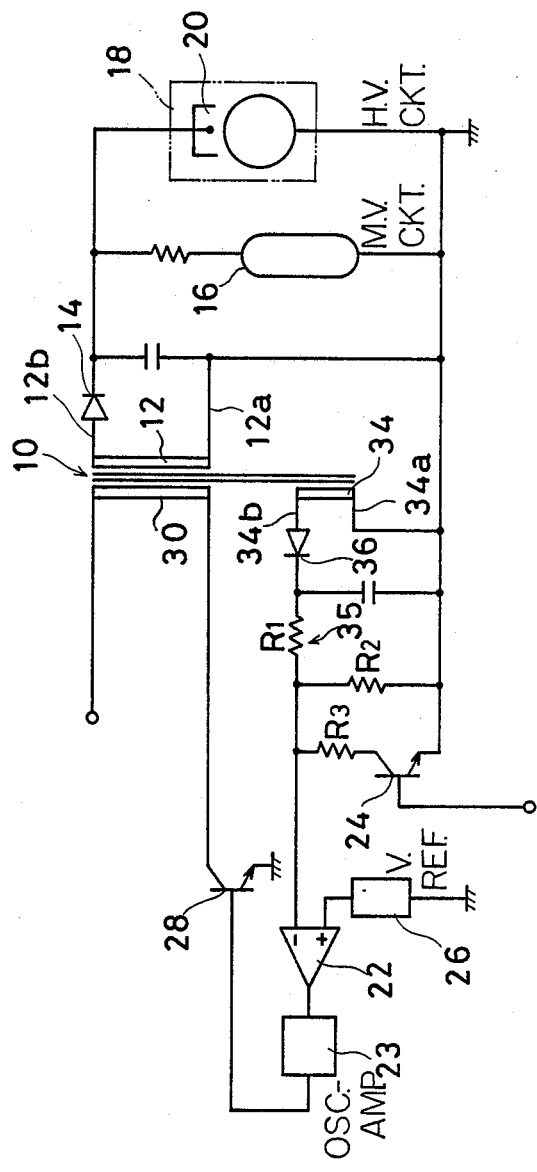
FIG. 3 is a circuit diagram showing still another embodiment in accordance with the present invention.

FIG. 3 is still another embodiment in accordance with the present invention. In the previous embodiments, to pick up the voltage correlating to the output voltage of the transformer 10, the output winding 12 itself thereof is used. On the other hand, in this embodiment, a feedback winding 34 is used to pick up the voltage correlating to the output voltage.

To be detailed, a shown in FIG. 3, the negative feedback winding 34 is magnetically coupled with the transformer 10. A low potential side 34a of this negative feedback winding 34 is grounded, and a voltage dividing circuit 35 constituted with the resistors $R_1$ and $R_2$ is connected to a high potential side 34b thereof through a forward diode 36. More specifically, one end of the resistor $R_1$ is connected to the cathode of the diode 36. The resistor $R_2$ is connected between the other end of the resistor $R_1$ and the ground. The connection point of the resistors $R_1$ and $R_2$ is connected to the (−) input of the comparator 22 as in the previous embodiments. Also, a series connection of the resistor $R_3$ and the transistor 24 is connected to the resistor $R_2$ in parallel.

In the FIG. 3 embodiment, when operating no only the medium voltage circuit 16 but also the high voltage circuit 18, a high-level voltage is applied to the base of the transistor 24 from the controlling circuit which is not illustrated. Then, the transistor 24 is turned on, and the resistor $R_3$ is connected to the resistor $R_2$ of the voltage dividing circuit 35 in parallel. For this reason, the input voltage Vs to the voltage comparator 22 is reduced in comparison with the case where the transistor 24 is turned off according to the following equation (5).

$$Vs=(V_0/N)\cdot Rf/(R_1+Rf) \quad (5)$$

where, N is the ratio of number of turns of the output winding 12 to that of the negative feedback winding 34, and $Rf=R_2\cdot R_3/(R_2+R_3)$.

This reduction in the voltage Vs increases the output of the voltage comparator 22. Accordingly, the ON time of the transistor 24 becomes long, the AC voltage generated in the input winding 30 is increased, and the induced voltage of the output voltage $V_0$ is also increased. At this time, by setting the output voltage $V_0$ higher than the operating voltage of the corona discharger 20 comprised in the high voltage circuit 18, both the medium voltage circuit 16 and the high voltage circuit 18 can be operated.

To put the high voltage circuit 18 in the non-operating state, a low-level voltage is given to the base of the transistor 24 from the controlling circuit (not illustrated). Responsively, this transistor 24 is turned off. At this time, the output voltage Vs' of the voltage dividing circuit is expressed by the following equation (6), becoming large in comparison with the case of the preceding equation (5).

$$Vs'=(V_0'/N)\cdot R_2/(R_1+R_2) \quad (6)$$

Accordingly, the output of the voltage comparator 22 becomes small, and the switching operation of the transistor 28 is reduced, Consequently, the induced voltage of the output winding 12 of the transformer 10 becomes small. At this time, by setting the output voltage $V_0$ lower than the discharge starting voltage of the corona discharger 20, no current flows into the high voltage circuit 18, and this high voltage circuit 18 is virtually turned off.

In accordance with the FIG. 3 embodiment, the voltage correlating to the output voltage of the output winding 12 is picked up by the negative feedback winding 34, and therefore the same circuit configuration can be utilized irrespective of the polarity of the output voltage from the output winding 12.

In addition, in the above-described embodiments, a bipolar transistor is used as a switching element constituting the switching circuit. However, this may be replaced by an FET.

Furthermore, in the above-described embodiments, the present invention is described with reference to examples in which it is used as a power supply apparatus for an electrostatic copier and so on. However, needless to say, the present invention can be utilized as an arbitrary power supply apparatus which supplies power to both a medium voltage circuit and a high voltage circuit from the common transformer.

Also, if a switching means for the medium voltage circuit is provided in connection with the same, the medium voltage circuit can be turned off independently from the high voltage circuit 18.

Although embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A high-voltage power supply apparatus, comprising:
    a transformer having an input winding and an output winding,
    a medium voltage circuit and a high voltage circuit connected in parallel to each other between one end of said output winding and a reference potential,
    a voltage dividing circuit wherein at least two resistors are connected in series and which receives and divides a voltage correlating to an output voltage of said output winding,
    controlling means for controlling the amount of an AC current flowing into the input winding of said transformer in accordance with an output voltage of said voltage dividing circuit,
    a switching circuit connected in parallel with one resistor of said voltage dividing circuit, and
    means for turning said switching circuit on or off to vary the magnitude of the output voltage of said voltage dividing circuit, and thereby controlling the magnitude of the output voltage from said output winding;
    wherein said high voltage circuit includes a device which stops operation of said high voltage circuit and puts it virtually in the turn-off state when the output voltage of said output winding is lower than a predetermined value.

2. A high-voltage power supply apparatus in accordance with claim 1, wherein said device comprises a corona discharger connected to said output winding.

3. A high-voltage power supply apparatus in accordance with claim 1, wherein said voltage dividing circuit receives an output voltage of said output winding.

4. A high-voltage power supply apparatus in accordance with claim 1, wherein said transformer comprises a feedback winding coupled magnetically with said output winding, an said voltage dividing circuit receives an output voltage of said feedback winding.

5. A high-voltage power supply apparatus in accordance with claim 1, wherein said switching circuit comprises a series connection of a switching element and a resistor.

6. A high-voltage power supply apparatus in accordance with claim 1, wherein said controlling means includes a switching element for generating an AC current by turning on and off said input winding, and means for varying the turned-on or -off state of said switching element, and thereby regulating the output voltage of said output winding.

* * * * *